United States Patent
Song et al.

(10) Patent No.: US 10,580,579 B2
(45) Date of Patent: Mar. 3, 2020

(54) MULTILAYER CERAMIC CAPACITOR AND METHOD OF MANUFACTURING THE SAME

(71) Applicant: SAMSUNG ELECTRO-MECHANICS CO., LTD., Suwon-si, Gyeonggi-do (KR)

(72) Inventors: Seung Woo Song, Suwon-si (KR); Taek Jung Lee, Suwon-si (KR); Jin Kyung Joo, Suwon-si (KR); Hyo Youn Lee, Suwon-si (KR); Sung Kwon An, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/008,865

(22) Filed: Jun. 14, 2018

(65) Prior Publication Data

US 2019/0074138 A1 Mar. 7, 2019

(30) Foreign Application Priority Data

Sep. 7, 2017 (KR) .................. 10-2017-0114260

(51) Int. Cl.
*H01G 4/30* (2006.01)
*H01G 4/236* (2006.01)
(Continued)

(52) U.S. Cl.
CPC .............. *H01G 4/236* (2013.01); *H01G 4/008* (2013.01); *H01G 4/012* (2013.01); *H01G 4/232* (2013.01);
(Continued)

(58) Field of Classification Search
CPC .......... H01G 4/30; H01G 4/012; H01G 4/008; H01G 4/12; H01G 4/232; H01G 4/236; H05K 1/11; H05K 1/09; H05K 1/02
See application file for complete search history.

(56) References Cited

U.S. PATENT DOCUMENTS

2002/0158307 A1* 10/2002 Honda .................. H01G 4/232
257/532
2006/0049131 A1* 3/2006 Satou ................... H01G 4/2325
216/13
(Continued)

FOREIGN PATENT DOCUMENTS

JP 2001-313230 A 11/2001
JP 4748317 B2 8/2011
(Continued)

*Primary Examiner* — Nguyen T Ha
(74) *Attorney, Agent, or Firm* — Morgan, Lewis & Bockius LLP

(57) ABSTRACT

A multilayer ceramic capacitor includes a body a first internal electrode and a second internal electrode disposed with a dielectric layer interposed therebetween, a first connecting electrode connected to the first internal electrode through the body, a second connecting electrode connected to the second internal electrode through the body, a first external electrode disposed on one surface of the body and connected to the first connecting electrode, and a second external electrode disposed on one surface of the body, spaced apart from the first external electrode, and connected to the second connecting electrode, wherein the first and second external electrodes each include a first electrode layer disposed on the body and including ceramics, and a second electrode layer disposed on the first electrode layer and having the content of ceramics smaller than that of the first electrode layer.

16 Claims, 4 Drawing Sheets

(51) Int. Cl.
 *H01G 4/008* (2006.01)
 *H01G 4/252* (2006.01)
 *H01G 4/232* (2006.01)
 *H01G 4/012* (2006.01)
 *H01G 4/12* (2006.01)

(52) U.S. Cl.
 CPC ........... *H01G 4/2325* (2013.01); *H01G 4/252* (2013.01); *H01G 4/30* (2013.01); *H01G 4/1227* (2013.01)

(56) References Cited

U.S. PATENT DOCUMENTS

| | | | |
|---|---|---|---|
| 2007/0047175 A1* | 3/2007 | Sato | H01G 4/012 361/303 |
| 2014/0043724 A1 | 2/2014 | Kang et al. | |
| 2015/0028726 A1* | 1/2015 | Kim | H01L 41/0474 310/365 |
| 2015/0124371 A1* | 5/2015 | Park | H01G 4/012 361/301.4 |
| 2015/0287514 A1* | 10/2015 | Lim | H01F 17/0013 336/65 |
| 2015/0302991 A1* | 10/2015 | Choi | H01G 4/232 174/260 |
| 2016/0157341 A1* | 6/2016 | Lee | H01L 23/49822 174/251 |
| 2017/0194419 A1* | 7/2017 | Lee | H01L 27/016 |
| 2018/0132355 A1* | 5/2018 | Saita | H01G 4/008 |

FOREIGN PATENT DOCUMENTS

| | | |
|---|---|---|
| JP | 2013-062291 A | 4/2013 |
| KR | 10-2014-0021416 A | 2/2014 |

\* cited by examiner

MULTILAYER CERAMIC CAPACITOR AND METHOD OF MANUFACTURING THE SAME

CROSS-REFERENCE TO RELATED APPLICATION

This application is based on and claims the benefit of priority to Korean Patent Application No. 10-2017-0114260 filed on Sep. 7, 2017 in the Korean Intellectual Property Office, the entire disclosure of which is incorporated herein by reference.

TECHNICAL FIELD

The present disclosure relates to a multilayer ceramic capacitor and a method of manufacturing the same.

BACKGROUND

As the performance of electronic products, computers, and the like, is improved, multilayer ceramic capacitors (MLCCs), components applied thereto, are required to have high capacity and high reliability.

Further, with the miniaturization of mobile communication devices and electronic devices, MLCCs, components applied thereto, are also required to be smaller and thinner.

Accordingly, development of an MLCC in which a via or a through hole is formed, a via electrode connected to an internal electrode is formed by filling the via or the through hole with a conductive material, and a bottom electrode to be connected with the via electrode is formed is ongoing.

SUMMARY

An aspect of the present disclosure may provide a multilayer ceramic capacitor including an external electrode having excellent adhesion with respect to a body and a plating layer as well, and a method of manufacturing the same.

According to an aspect of the present disclosure, a multilayer ceramic capacitor may include: a body including a first internal electrode and a second internal electrode disposed with a dielectric layer interposed therebetween; a first connecting electrode connected to the first internal electrode through the body; a second connecting electrode connected to the second internal electrode through the body; a first external electrode disposed on one surface of the body and connected to the first connecting electrode; and a second external electrode disposed on one surface of the body, spaced apart from the first external electrode, and connected to the second connecting electrode, wherein the first and second external electrodes each include a first electrode layer disposed on the body and including ceramics; and a second electrode layer disposed on the first electrode layer and having the content of ceramics smaller than that of the first electrode layer.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Figure 1:
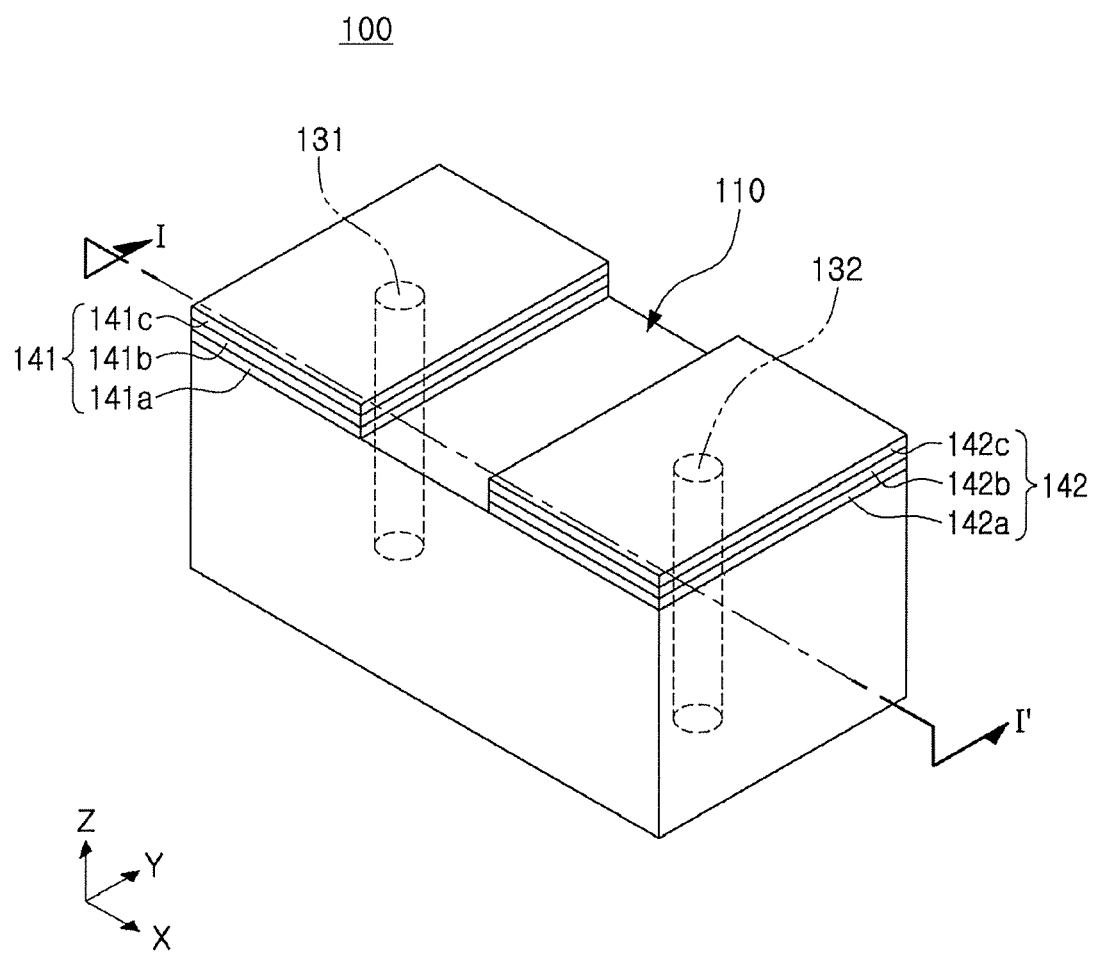
FIG. 1 is a perspective view schematically illustrating a multilayer ceramic capacitor (MLCC) according to an exemplary embodiment in the present disclosure.
Figure 2:
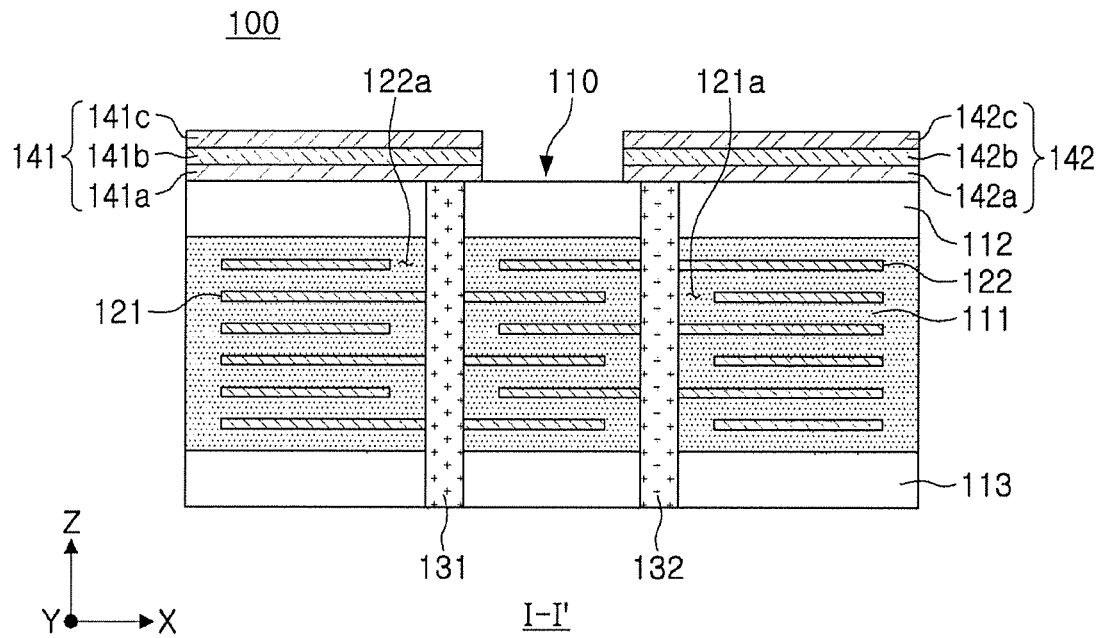
FIG. 2 is a schematic cross-sectional view of the MLCC of FIG. 1, taken along line I-I'.

FIG. 1 is a perspective view schematically illustrating a multilayer ceramic capacitor (MLCC) according to an exemplary embodiment in the present disclosure, and FIG. 2 is a schematic cross-sectional view of the MLCC of FIG. 1, taken along line I-I'.

A structure of the MLCC 100 according to an exemplary embodiment in the present disclosure will be described with reference to FIGS. 1 and 2.

The MLCC 100 according to an exemplary embodiment in the present disclosure includes a body 110 and first and second external electrodes 141 and 142 disposed on an outer surface of the body.

The body 110 is formed by stacking a plurality of dielectric layers 111 and may be obtained by laminating a plurality of green sheets and subsequently sintering the laminated green sheets. Through the sintering, a plurality of dielectric layers 111 may have an integrated form. The shape and dimensions of the body 110 and the number of stacked dielectric layers 111 are not limited to those illustrated in the present exemplary embodiment. As illustrated in FIG. 1, the body 110 may have a rectangular parallelepiped shape, for example.

The dielectric layer 111 included in the body 110 may include a ceramic material having a high dielectric constant. For example, the dielectric layer 111 may include a barium titanate ($BaTiO_3$)-based or a strontium titanate ($SrTiO_3$)-based material, but any other material known in the art may also be used as long as it may obtain sufficient capacitance. The ($BaTiO_3$)-based ceramic powder may include, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$ obtained by partially employing calcium (Ca), zirconium (Zr), and the like, in $BaTiO_3$. The dielectric layer ill may further include an additive, an organic solvent, a plasticizer, a binder, a dispersant, and the like, if necessary, together with the ceramic material as a main component, and here, the dielectric layer 111 may include the same material as that added to internal electrodes 121 and 122, as an additive, and a concentration of the additive is appropriately adjusted locally to ensure uniform sintering properties.

The body 110 may be formed by stacking four or more dielectric layers 111. For example, the body 110 may be formed by stacking 400 to 500 dielectric layers. A first cover layer 112 and a second cover layer 113 formed by stacking dielectric layers without an internal electrode may be disposed on upper and lower surfaces of the body 110, respectively.

The body 110 includes first and second internal electrodes 121 and 122 formed on an inner side thereof. The first and second internal electrodes 121 and 122 are disposed to face each other with the dielectric layer 111 interposed therebetween. The first and second internal electrodes 121 and 122 may be connected to different external electrodes 141 and 142 and have different polarities when driven. The first and second internal electrodes 121 and 122 may be obtained by printing a paste containing a conductive metal to have a predetermined thickness on one surface of a ceramic green sheet and subsequently sintering the same. A main constituent material of the first and second internal electrodes 121 and 122 may be nickel (Ni), copper (Cu), palladium (Pd), silver (Ag), and the like, and alloys thereof may also be used.

Here, the first and second internal electrodes 121 and 122 may include first and second insulation portions 121a and 122a, respectively. The first and second insulating portions 121a and 122a refer to regions in which the first and second internal electrodes 121 and 122 are not formed, and serve to allow the first and second internal electrodes 121 and 122 to be connected only to external electrodes having different polarities, respectively. That is, a first connecting electrode 131 is separated from the second internal electrode 122 by the second insulation portion 122a and the second connecting electrode 132 is separated from the first internal electrode 121 by the first insulation portion 121a.

Since the first and second internal electrodes 121 and 122 are connected to the first and second external electrodes 141 and 142 by the first and second connecting electrodes 131 and 132, respectively, an area in which the first and second internal electrodes 121 and 122 overlap each other with the dielectric layer 111 interposed therebetween may be maximized, significantly increasing capacitance of the MLCC 100.

The first external electrode 141 is disposed on one surface of the body 110 and connected to the first connecting electrode 131 and the second external electrode 142 is disposed on one surface of the body 110 and connected to the second connecting electrode 132.

The first and second connecting electrodes 131 and 132 may be formed by filling the holes H1 and H2 penetrating through the body 110 with a conductive material.

Meanwhile, the first and second external electrodes 141 and 142 may be disposed on only one surface of the body 110. In this manner, the first and second external electrodes 141 and 142 disposed on only one surface of the body 110 may be defined as bottom electrodes. The MLCC 100 having such a bottom electrode structure may reduce a marginal part on the side surface connecting the upper surface and the lower surface of the body 110 to increase a region for forming the first and second internal electrodes 121 and 122, significantly enhancing capacitance of the MLCC 100. That is, since the MLCC 100 according to an exemplary embodiment in the present disclosure has the bottom electrode structure and the structure in which the internal electrodes are connected to the external electrodes through the connecting electrodes penetrating through the body, capacitance of the MLCC 100 may further be improved.

Hereinafter, a structure of the external electrode 141 will be described with reference to FIG. 2, and the same description may also be applied to the second external electrode 142.

Referring to FIG. 2, the first external electrode 141 includes first and second electrode layers 141a and 141b.

The first electrode layer 141a includes ceramics, and thus, it may serve to enhance adhesion between the body 110 and the first external electrode 141.

The second electrode layer 141b may be disposed on the first electrode layer 141a. Since the content of ceramic of the second electrode layer 141b is smaller than that of the first electrode layer, the second electrode layer 141b may serve to increase conductivity, allow a plating layer to be formed to be even, and enhance adhesion with respect to the plating layer.

Here, the ceramics included in the first and second electrode layers 141a and 141b are the same material as that included in the dielectric layer 111, and thus, adhesion may further be enhanced.

In addition, in order to ensure conductivity, the first and second electrode layers 141a and 141b further include a metal in addition to. For example, the first and second electrode layers 141a and 141b may further include at least one of copper (Cu), nickel (Ni), tin (Sn), tungsten (W), and gold (Au).

Figure 3:
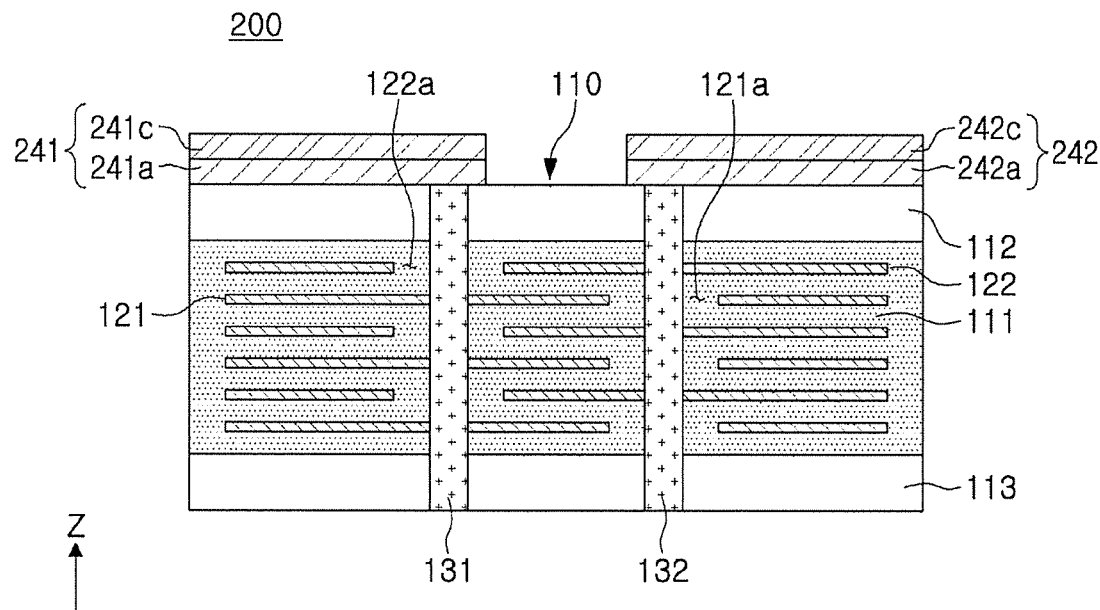
FIG. 3 is a schematic cross-sectional view of a conventional MLCC.

The structure of the external electrodes 241 and 242 will be described with reference to FIG. 3 which is a sectional view of the related art MLCC 200. Referring to FIG. 3, adhesion between the body and the external electrode is improved by adding the plating layer 242c. However, since the plating layer 242c is directly disposed on the electrode layer 242a having a high content of ceramics, the plating layer 232c is difficult to form uniformly, resulting in low plating adhesion and solderability.

In contrast, in the MLCC 100 according to an exemplary embodiment in the present invention, since the plating layer 141c is disposed on the second electrode layer 141b having a smaller content of ceramics than that of the first electrode layer 141a, the plating layer 141c may be formed uniformly, obtaining excellent plating adhesion and solderability to enhance mounting reliability.

The external electrodes of the MLCC 100 according to an exemplary embodiment in the present invention may further include a plating layer 141c. The plating layer 141c may serve as a solder adhesion layer improving adhesion with solder. For example, the plating layer may include at least one of Au, Cu and Sn.

The first electrode layer 141a may include 70 to 85 wt % of metal and 15 to 30 wt % of ceramic. The second electrode layer 141b may include 90 to 98 wt % of metal and 2 to 10 wt % of ceramics.

If the content of metal in the first electrode layer 141a exceeds 85 wt % or the content of ceramics in the first electrode layer 141a is less than 15 wt %, adhesion between the body and the external electrodes may be poor. On the other hand, when the content of metal in the first metal layer 141a is less than 70 wt % or the content of ceramics exceeds 30 wt %, conductivity may be lowered and adhesion between the first electrode layer 141a and the second electrode layer 141b may be degraded.

If the content of metal of the second electrode layer 141b exceeds 98 wt % or the content of ceramics is less than 2 wt %, adhesion between the first electrode layer 141a and the second electrode layer 141b may be lowered. On the other hand, when the content of metal of the second electrode layer 141b is less than 90 wt % or the content of ceramics exceeds 10 wt %, the plating layer may be unevenly formed during formation of the plating layer, degrading adhesion and solderability.

More preferably, the first electrode layer 141a may include 75 to 80 wt % of metal and 20 to 25 wt % of ceramics, and the second electrode layer 141b may include 92 to 96 wt % of metal and 4 to 8 wt % of ceramics.

Table 1 below shows evaluation of adhesion between the first electrode layer 141a and the second electrode layer 141b and the plating layer 141c according to the content of ceramics of the first electrode layer 141a and the second electrode layer 141b.

Adhesion was tested by a tape test and evaluated based on a Defect rate after the adhesion test. The evaluation criteria are as follows.

○: Defect rate is 10% or less
Δ: Defect rate exceeds 10% and is 30% or less
x: Defect rate exceeds 30%

TABLE 1

| Test No. | First electrode layer | | Second electrode layer | | Adhesion |
|---|---|---|---|---|---|
| | Metal (wt %) | Ceramic (wt %) | Metal (wt %) | Ceramic (wt %) | |
| 1* | 95 | 5 | 95 | 5 | X |
| 2* | 90 | 10 | 95 | 5 | X |
| 3 | 85 | 15 | 95 | 5 | Δ |
| 4 | 80 | 20 | 95 | 5 | ○ |
| 5 | 75 | 25 | 95 | 5 | ○ |
| 6 | 70 | 30 | 95 | 5 | Δ |
| 7* | 65 | 35 | 95 | 5 | X |
| 8* | 80 | 20 | 100 | 0 | X |
| 9 | 80 | 20 | 98 | 2 | Δ |
| 10 | 80 | 20 | 96 | 4 | ○ |
| 11 | 80 | 20 | 94 | 6 | ○ |
| 12 | 80 | 20 | 92 | 8 | ○ |
| 13 | 80 | 20 | 90 | 10 | Δ |
| 14* | 80 | 20 | 88 | 12 | X |

*Comparative example

Referring to Table 1, it can be seen that excellent adhesion is ensured when the first electrode layer 141a includes 70 to 85 wt % of metal and 15 to 30 wt % of ceramics and the second electrode layer 141b includes 90 to 98 wt % of metal and 2 to 10 wt % of ceramics.

Also, it can be seen that excellent adhesion is ensured when the first electrode layer 141a includes 75 to 80 wt % of metal and 20 to 25 wt % of ceramics and the second electrode layer 141b includes 92 to 96 wt % of metal and 4 to 8 wt % of ceramics.

FIGS. 4 through 7 illustrate a method of manufacturing the MLCC illustrated in FIGS. 1 and 2. The method of manufacturing the MLCC illustrated in FIGS. 1 and 2 of the present disclosure will be described with reference to FIGS. 4 through 7. From the description of the manufacturing method, the structure of the above-described MLCC may further be clarified.

Figure 4:
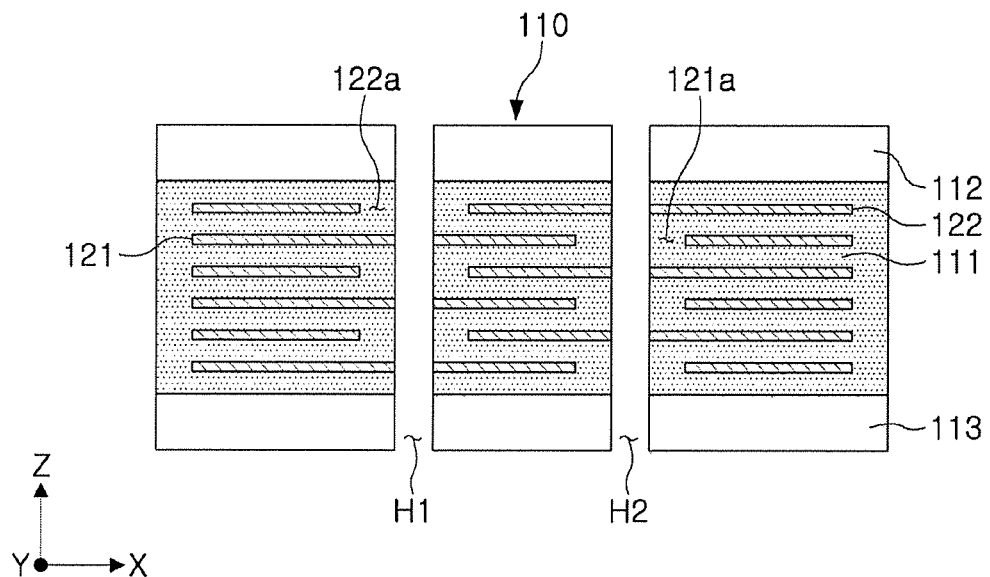
FIGS. 4 through 7 are cross-sectional views schematically illustrating a sequential process of a method of manufacturing an MLCC according to an exemplary embodiment in the present disclosure.

First, as illustrated in FIG. 4, a body including a dielectric layer and first and second internal electrodes disposed with the dielectric layer interposed therebetween by stacking sheets formed by printing a paste including a conductive metal to have a predetermined thickness on one surface of each of ceramic green sheets formed of a dielectric layer is prepared.

A dielectric layer without an internal electrode may be stacked on upper and lower surfaces of the body 110 to form the first cover layer 112 and the second cover layer 113.

Subsequently, as illustrated in FIG. 4, holes H1 and H2 are formed using a laser drill, a mechanical pin punch, and the like.

Figure 5:
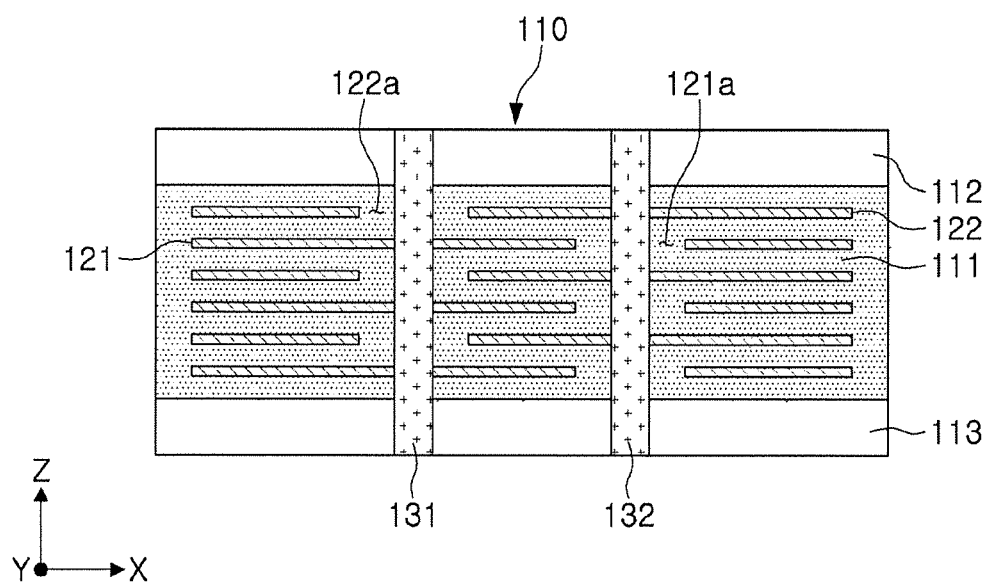
Figure 6:
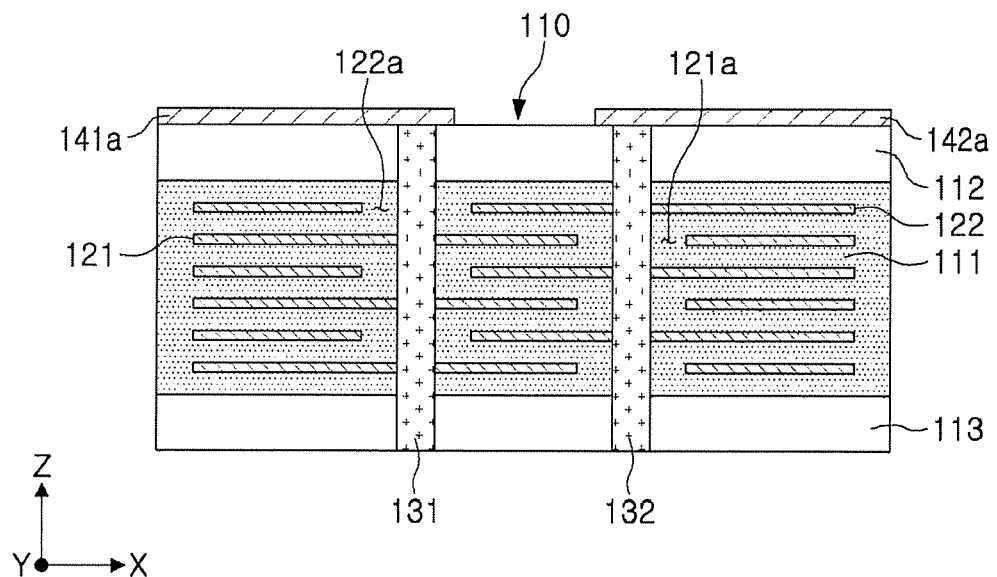

Thereafter, as illustrated in FIG. 5, the holes H1 and H2 are filled with a conductive material using a method such as applying a conductive paste, plating, and the like, to form the first and second connecting electrodes 131 and 132.

Thereafter, the first external electrode 151 connected to the first connecting electrode 131 and the second external electrode 152 connected to the second connecting electrode 132 are formed on one surface of the body 110.

Figure 7:
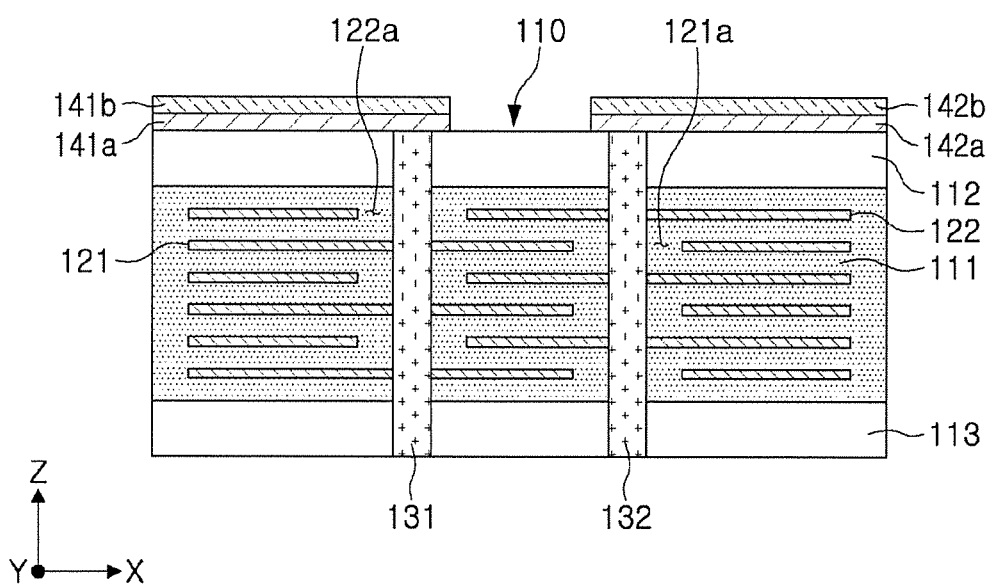

In detail, the forming of the first and second external electrodes may include forming a first electrode layer including ceramics on the body (FIG. 6); and forming a second electrode layer having the content of ceramics smaller than that of the first electrode layer on the first electrode layer (FIG. 7).

The first electrode layer may be formed by applying a conductive paste including a metal and a ceramic additive, and the second electrode layer may be formed by applying a conductive paste including a metal and a ceramic additive and having the content of ceramic additive smaller than that of the first electrode layer.

Here, the ceramic additive included in the first and second electrode layers 141a and 141b may be the same material as the ceramic material included in the dielectric layer 111 to further enhance adhesion, and the metal may be one or more selected from among Cu, Ni, Sn, W, and Au.

After the second electrode layer is formed, calcining and sintering are performed and a plating layer is formed on the second electrode layer, completing the MLCC illustrated in FIGS. 1 and 2.

As set forth above, in the MLCC according to exemplary embodiments of the present disclosure, since the first and second external electrodes include the first and second electrode layers, adhesion with respect to the plating layer, as well as adhesion with respect to the body may be enhanced, and excellent solderability enhances mounting reliability.

In addition, since the first and second internal electrodes are connected to the first and second external electrodes using the first and second connecting electrodes, the area in which the first and second internal electrodes overlap in the stacking direction is increased, improving capacitance of the MLCC.

While exemplary embodiments have been shown and described above, it will be apparent to those skilled in the art that modifications and variations could be made without departing from the scope of the present invention as defined by the appended claims.

What is claimed is:

1. A multilayer ceramic capacitor comprising:
   a body including a first internal electrode and a second internal electrode disposed with a first dielectric layer interposed therebetween;
   a second dielectric layer, without having the first and second internal electrodes, disposed on one of an upper surface or a lower surface of the body;
   a first connecting electrode connected to the first internal electrode through the body and exposed from the second dielectric layer;
   a second connecting electrode connected to the second internal electrode through the body and exposed from the second dielectric layer;
   a first external electrode disposed on one surface of the second dielectric layer and connected to the first connecting electrode; and
   a second external electrode disposed on the one surface of the second dielectric layer, spaced apart from the first external electrode, and connected to the second connecting electrode,
   wherein the first and second external electrodes each include a first electrode layer disposed on the one surface of the second dielectric layer and including ceramics, and a second electrode layer disposed on the first electrode layer and having a content of ceramics smaller than that of the first electrode layer, and
   the first electrode layer has a lower surface in contact with the second dielectric layer, an upper surface in contact with the second electrode layer, and side surfaces connecting the lower surface and the upper surface of the first electrode layer to each other and spaced apart from any dielectric layer of the multilayer ceramic capacitor.

2. The multilayer ceramic capacitor of claim 1, wherein the first electrode layer includes 70 to 85 wt % of metal and 15 to 30 wt % of ceramic, and the second electrode layer includes 90 to 98 wt % of metal and 2 to 10 wt % of ceramics.

3. The multilayer ceramic capacitor of claim 2, wherein the metal is one or more selected from among Cu, Ni, Sn, W, and Au.

4. The multilayer ceramic capacitor of claim 1, wherein the ceramics is the same material as a ceramic material included in the first dielectric layer.

5. The multilayer ceramic capacitor of claim 1, wherein the first and second external electrodes each further include a plating layer disposed on the second electrode layer.

6. The multilayer ceramic capacitor of claim 5, wherein side surfaces of the second electrode layer are exposed from the plating layer.

7. The multilayer ceramic capacitor of claim 1, wherein the first connecting electrode is separated from the second internal electrode by a first insulting portion, and the second connecting electrode is separated from the first internal electrode by a second insulating portion.

8. The multilayer ceramic capacitor of claim 1, wherein the first and second external electrodes are disposed only on the one surface of the second dielectric layer.

9. The multilayer ceramic capacitor of claim 1, wherein wherein the first and second internal electrodes are not exposed to an outer surface of the body.

10. A method of manufacturing a multilayer ceramic capacitor, the method comprising:
    forming a body including a first internal electrode and a second internal electrode disposed with a dielectric layer interposed therebetween;
    forming a second dielectric layer, without having the first and second internal electrodes, on one of an upper surface or a lower surface of the body;
    forming first and second holes penetrating through the body and the second dielectric layer;
    filling the first and second holes with a conductive material to form a first connecting electrode connected to the first internal electrode and a second connecting electrode connected to the second internal electrode; and
    forming a first external electrode connected to the first connecting electrode, and a second external electrode spaced apart from the first external electrode and connected to the second connecting electrode, on one surface of the second dielectric layer,
    wherein the forming of the first and second external electrodes includes:
    forming a first electrode layer including ceramics on the one surface of the second dielectric layer; and
    forming a second electrode layer having a content of ceramics smaller than that of the first electrode layer, on the first electrode layer, and
    the first electrode layer has a lower surface in contact with the second dielectric layer, an upper surface in contact with the second electrode layer, and side surfaces connecting the lower surface and the upper surface of the first electrode layer and spaced apart from any dielectric layer of the multilayer ceramic capacitor.

11. The method of claim 10, wherein the first electrode layer includes 70 to 85 wt % of metal and 15 to 30 wt % of ceramic, and the second electrode layer includes 90 to 98 wt % of metal and 2 to 10 wt % of ceramics.

12. The method of claim 11, wherein the metal is one or more selected from among Cu, Ni, Sn, W, and Au.

13. The method of claim 10, wherein the ceramics is the same material as a ceramic material included in the first dielectric layer.

14. The method of claim 10, wherein the forming of the first and second external electrodes further includes performing calcining and sintering after the second electrode layer is formed, and forming a plating layer on the second electrode layer.

15. The method of claim 14, wherein side surfaces of the second electrode layer are exposed from the plating layer.

16. The method of claim 10, wherein wherein the first and second internal electrodes are not exposed to an outer surface of the body.

* * * * *